United States Patent

Fukuoka et al.

Patent Number: 4,703,102
Date of Patent: Oct. 27, 1987

[54] AROMATIC POLYETHER KETONES

[75] Inventors: Shinsuke Fukuoka, Kurashiki; Hideki Matsuda, Fuji, both of Japan

[73] Assignee: Asahi Kasei Kogyo Kabushiki Kaisha, Osaka, Japan

[21] Appl. No.: 756,073

[22] Filed: Jul. 17, 1985

[30] Foreign Application Priority Data

Jul. 19, 1984 [JP] Japan .................................. 59-148600
Jan. 31, 1985 [JP] Japan .................................. 60-17557

[51] Int. Cl.⁴ .......................... C08G 8/02; C08G 14/00
[52] U.S. Cl. ...................................... 528/125; 528/206
[58] Field of Search .................................. 528/125, 206

[56] References Cited

U.S. PATENT DOCUMENTS 4,399,270 8/1983 Frazer .................................. 528/125

Primary Examiner—John Kight
Assistant Examiner—M. L. Moore
Attorney, Agent, or Firm—Birch, Stewart, Kolasch & Birch

[57] ABSTRACT

An aromatic polyether ketone comprising 5 to 100 mole % of units having the formula:

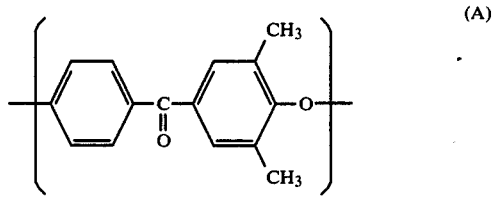

and 0 to 95 mole % of units having the formula:

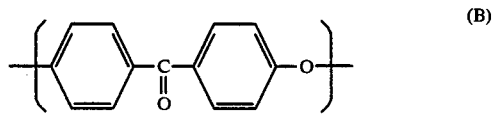

and having a reduced viscosity of about 0.1 to about 4.0 (30° C.), is novel and excellent in the properties such as heat resistance, chemical resistance and relatively easily melt processable. When at least one terminal group of the polymer is capped with an inert aromatic group, the properties are further improved.

13 Claims, 3 Drawing Figures

AROMATIC POLYETHER KETONES

BACKGROUND OF THE INVENTION

This invention relates to aromatic polyether ketones and a process for their production. More particularly, this invention relates to aromatic polyether ketones having chemical structures wherein phenylene groups are connected at their para positions via ether linkages and ketone linkages, and being characterized by excellent heat resistance, chemical resistance, physical properties and relatively easy processable property, and a process for producing thereof.

Heretofore, the aromatic polyether ether ketone so-called "PEEK" has been already known as one of the typical polymers wherein phenylene groups are connected at their para positions via ether linkages and ketone linkages, which comprises repeating units of the formula:

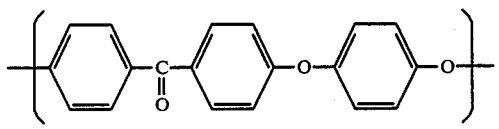

(e.g. T. C. Stening et al., Modern Plastics, November 1981, pp. 86–89).

Furthermore, it has been also known that aromatic polyether ketones comprising repeating units of the formula:

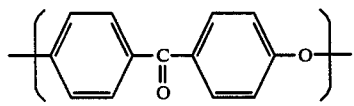

wherein ether linkages and ketone linkages are connected at the para positions of phenylene groups mutually. Such aromatic polyether ketones comprising units of the formula (B) can be produced, for example, by Friedel-Crafts reaction of 4-phenoxybenzoyl chloride in the presence of a Lewis acid catalyst such as boron trifluoride, aluminum chloride, etc. (U.S. Pat. Nos. 3,441,538, 3,442,857, 3,953,400, and 4,229,564, British Pat. Nos. 971,227, 1,086,021, 1,102,679 and 1,164,817); or by polycondensation of an alkali metal salt of 4-(p-halogenobenzoyl)phenyl (U.S. Pat. No. 3,634,355 and British Pat. No. 1,153,527); or by polycondensation of a 4,4'-dihalogenobenzophenone and a dialkali metal salt of 4,4'-dihydroxybenzophenone (U.S. Pat. Nos. 4,108,837 and 4,175,175, British Pat. Nos. 1,078,234 and 1,177,183).

Although it has been known that the thus produced aromatic polyether ketones having no substituents on aromatic rings are excellent in heat resistance, chemical resistance and mechanical properties, the melt processing of the polymers has been also known to be undesirably difficult, because they are crystalline polymers having a glass transition point of 154° C. and a melting point as remarkably high as 365°–367° C., and therefore they need extremely high temperature of 400° C. or higher for their melt processing.

SUMMARY OF THE INVENTION

This invention provides an aromatic polyether ketone comprising 5 to 100 mole % of units having the formula:

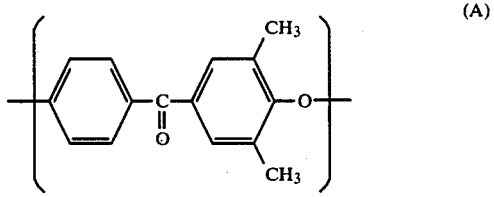

and 0 to 95 mole % of units having the formula:

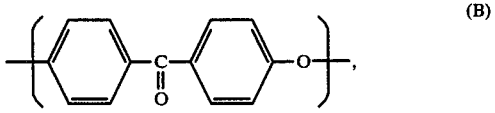

and having a reduced viscosity of about 0.1 to about 4.0 measured at 30° C. and a concentration of 0.1 g/dl by using 98 wt% sulfuric acid as a solvent.

This invention also provides a process for producing such aromatic polyether ketones, which comprises carrying out polycondensation of a mixture comprising 5 to 100 mole % of 4-(p-halogenobenzoyl)-2,6-dimethylphenol and 0 to 95 mole % of 4-(p-halogenobenzoyl)phenol by heating at a temperature of about 100° C. to about 400° C. in the presence or absence of a solvent.

This invention further provides an aromatic polyether ketone comprising 5 to 100 mole % of units having the formula (A) and 0 to 95 mole % of units having the formula (B), and at least one of two kinds of the polymer terminals being capped with an inert aromatic group.

This invention still further provides a process for producing such aromatic polyether ketones in which at least one of the two kinds of the polymer terminals being capped with an inert aromatic group.

DESCRIPTION OF THE PREFERRED EMBODIMENTS

Figure 1:
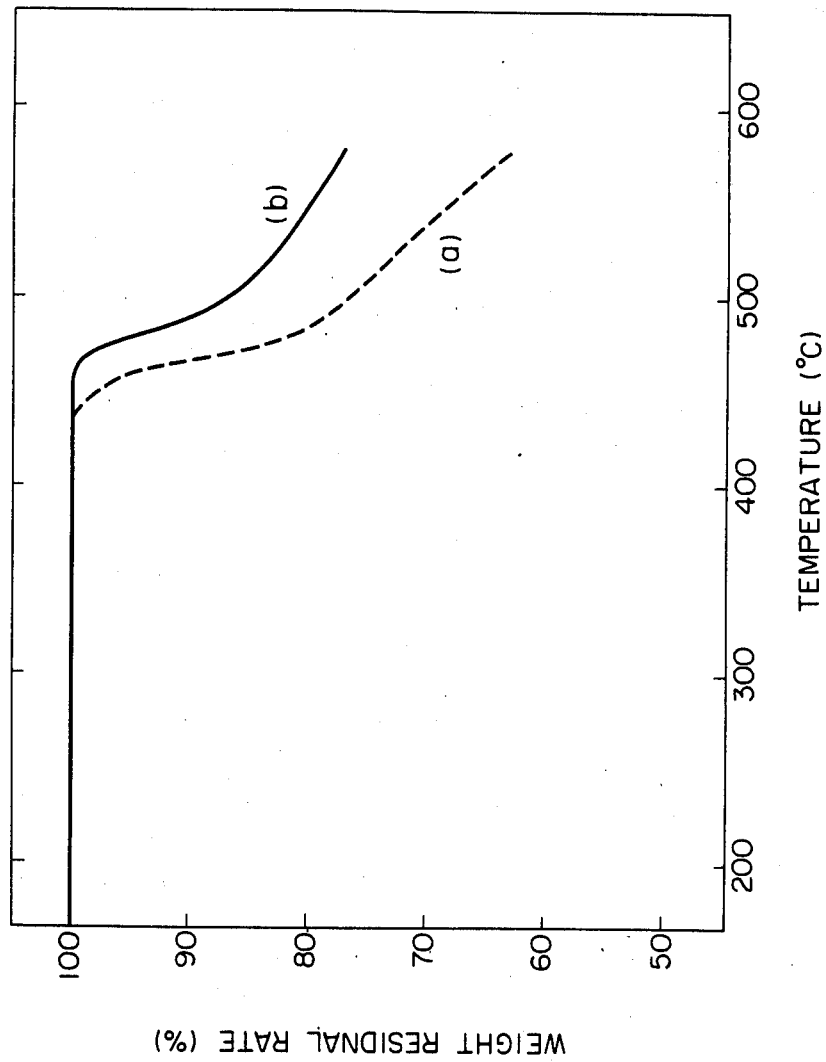
FIG. 1 is a thermogravimetric analysis chart of the aromatic polyether ketones obtained in Examples 1 and 2 according to this invention.

The aromatic polyether ketones of this invention are characterized by comprising units of the formula:

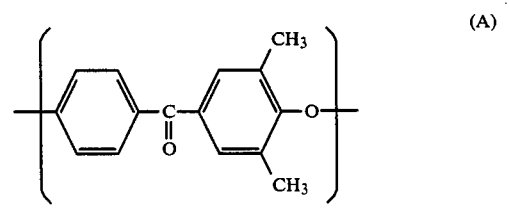

and being amorphous polymers having a glass transition point of about 230° C., or comprising units of the formula:

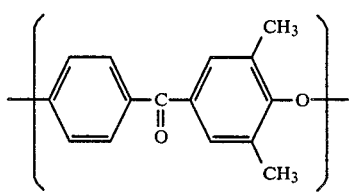

and units of the formula:

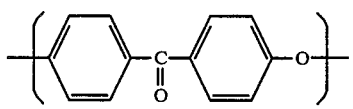

randomly bonded in the predetermined proportion. The aromatic polyether ketones may have at least either of the two kind of the polymer terminals capped with inert aromatic groups.

It is disclosed in U.S. Pat. Nos. 4,108,837 and 4,175,175 that aromatic polyether ketones having units of the formula:

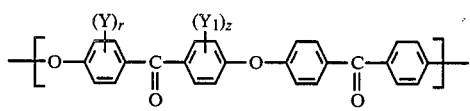

wherein Y and $Y_1$ can be the same or different inert substituent groups as alkyl groups having from 1 to 4 carbon atoms, halogen atoms, or alkoxy radicals having from 1 to 4 carbon atoms; r and z are integers of having a value from 0 to 4, can be produced in genera by polycondensation of a dinuclear phenol derivative of the formula:

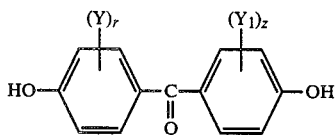

and a dihalogenobenzophenone. But no concrete example as to the polymer having the substituents, nor physical and chemical properties thereof is disclosed in these patents. Even if r=0, z=2, and Y=$CH_3$ in the formula (I) and these methyl groups are bonded to ortho positions with respect to the oxygen atom, such polymers are quite different from the aromatic polyether ketone having units of the formula (A) according to this invention and are also quite different from the aromatic polyether ketones comprising units of the formula (A) and units of the formula (B) bonded at random with the predetermined proportion according to this invention.

Thus, the aromatic polyether ketones of this invention which are characterized by having methyl substituents at the specific positions of the aromatic rings have not been described nor suggested in the prior art references. Therefore, it has not been known that the polymers of this invention have excellent properties in heat resistance, chemical resistance, mechanical and electrical properties, and relatively easy melt processable property.

Starting monomers used in this invention are a 4-(p-halogenobenzoyl)-2,6-dimethylphenol of the formula:

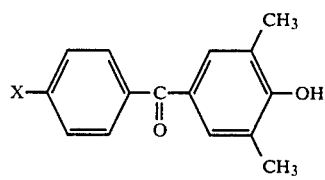

wherein X is a halogen atom, and a 4-(p-halogenobenzoyl)phenol of the formula:

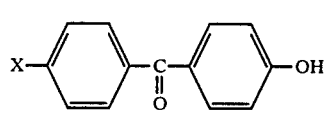

wherein X is a halogen atom. In formulae (C) and (D), fluorine and chlorine are preferable as the halogen atom, and fluorine is particularly preferable in formulae (C) and (D).

In this invention, the aromatic polyether ketones can be obtained by carrying out polycondensation of a mixture containing 5 to 100 mole % of 4-(p-halogenobenzoyl)-2,6-dimethylphenol of the formula (C) and 0 to 95 mole % of 4-(p-halogenobenzoyl)phenol of the formula (D) by heating at a temperature of about 100° C. to about 400° C.

The aromatic polyether ketones having capped polymer terminals can be produced by adding a terminal capping agent which is a special aromatic compound to the above-mentioned aromatic polyether ketones obtained by the polycondensation, followed by heating at a temperature of about 100° C. to about 400° C. to carry out the capping reaction, or alternatively adding the predetermined amount of a special terminal capping agent to the above-mentioned monomer mixture, followed by heating at a temperature of about 100° C. to 400° C. A more preferable method is to carry out the polycondensation reaction, followed by the capping reaction.

There is no particular limitation to the method of polycondensation reaction but the following two methods are advantageous.

The first method comprises using both 4-(p-halogenobenzoyl)-2,6-dimethylphenol and 4-(p-halogenobenzoyl)phenol in the form of alkali metal salts, mixing the monomers in the above-mentioned proportions, heating the mixture to carry out polycondensation while removing the alkali metal halide. Regarding alkali metal salts, sodium salts and potassium salts are preferable, and that both monomers are salts of the same alkali metal is preferable.

This polycondensation reaction can be carried out in the absence of a solvent or in the presence of a solvent having no bad influence on the reaction. As the solvent, there can be used those liquid at room temperature as well as those solid at room temperature but in the molten state at the reaction temperature. Preferable examples of the solvent are amide series solvents such as N,N-dimethylformamide, N-methylformamide, N,N-dimethylacetamide, N-methylacetanilide, N-methyl-2-pyrrolidone, hexamethylphosphortriamide, tetramethylurea, etc.; nitrile series solvents such as benzonitrile, tolunitrile, etc.; dialkyl sulfone series solvents such as dimethyl sulfone, diethyl sulfone, sulfolane, methylsulfolane, etc.; diaryl sulfone series solvents such as diphenyl sulfone, ditolyl sulfone, etc.; diaryl ethers such as diphenyl ether, ditolyl ether, etc.; ketones such as benzophenone, acetophenone, ditolyl ketone, etc.; and aromatic compounds having both ether likage and ketone linkage, etc. Further, derivatives of these compounds obtained by substituting one or more hydrogen atoms with lower alkyl groups, lower alkoxy groups, phenyl groups, and the like can also be used as solvents.

The reaction temperature and the reaction time vary depending on the kind of halogen atom and alkali metal of the starting monomers, the presence or absence of a solvent, and the kind of a solvent, but usually are about 100° C. to about 400° C. for 1 minute to 50 hours, preferably about 150° C. to about 350° C. for 5 minutes to 25 hours.

The alkali metal salts of 4-(p-halogenobenzoyl)-2,6-dimethylphenol and the alkali metal salts of 4-(p-halogenobenzoyl)phenol can be produced by conventional processes. For example, these alkali metal salts can be easily prepared by carrying out the reaction of 4-(p-halogenobenzoyl)-2,6-dimethylphenol and 4-(p-halogenobenzoyl)phenol with an aqueous solution of hydroxide, or carbonate, or bicarbonate of an alkali metal, or a lower alcohol solution of an alkali metal hydroxide, followed by removing the water or the alcohol and drying.

The second method of the polymerization reaction comprises heating a mixture of 4-(p-halogenobenzoyl)-2,6-dimethylphenol and 4-(p-halogenobenzoyl)phenol in the predetermined proportions in the presence of at least one member selected from the group consisting of alkali metal carbonates and alkali metal bicarbonates to carry out the polycondensation.

Examples of the alkali metal carbonates and alkali metal bicarbonates are lithium carbonate, sodium carbonate, potassium carbonate, rubidium carbonate, cesium carbonate, lithium bicarbonate, sodium bicarbonate, potassium bicarbonate, rubidium bicarbonate and cesium bicarbonate. These alkali metal carbonates and bicarbonates are preferably used in the anhydrous form.

These alkali metal carbonates and bicarbonates are usually used in an amount of from 0.1 to 5 moles, preferably 0.3 to 2 moles per mole of a total of 4-(p-halogenobenzoyl)-2,6-dimethylphenol and 4-(p-halogenobenzoyl)phenol.

This polycondensation reaction can be also carried out in the absence of a solvent or in the presence of a solvent mentioned in the first method.

The reaction temperature and the reaction time vary depending on the kind of halogen atom in the starting monomers, the kind of alkali metal carbonate or bicarbonate, the presence or absence of a solvent, and the kind of the solvent, but usually are about 100° C. to about 400° C. for 1 minute to 50 hours, preferably about 150° C. to about 350° C. for 5 minutes to 25 hours.

The monomers, 4-(p-halogenobenzoyl)-2,6-dimethylphenol and 4-(p-halogenobenzoyl)phenol, can be prepared by conventional processes, but the halogen atom and the hydroxyl group should be bonded substantially to the para positions, respectively. One of the preferable methods for the preparation of 4-(p-halogenobenzoyl)-2,6-dimethylphenol comprises carrying out the Fries rearrangement of 2,6-dimethylphenyl p-halogenobenzoate. In this case, since the methyl groups are substituted at the 2- and 6-positions with respect to the hydroxyl group, only the desired para isomer is formed.

The aromatic polyether ketones produced by the above-mentioned polycondensation processes are novel and have units of the formula (A) and units of the formula (B) bonded randomly at a predetermined ratio, except for the case wherein 4-(p-halogenobenzoyl)-2,6-dimethylphenol or an alkali metal salt thereof alone is used as a starting monomer.

Further, the aromatic polyether ketones produced in this invention are mostly amorphous polymers, but crystalline portions can be included in the polymers depending on the proportion of the unit (B). More concretely, when the proportion of the unit (A) in the polymer is about 30 mole % or more, the polymer is amorphous, while when the proportion of the unit (A) in the polymer is about 20 mole % to less than about 30 mole %, the polymer contains partially crystalline portions. When the proportion of the unit (A) is 5 mole % to less than about 20 mole %, the polymer is crystalline.

The aromatic polyether ketones of this invention are characterized by containing 5 mole % or more of units (A), which results in improving the dimensional stability of the shaped articles at higher temperatures due to the raise of the glass transition point about 10° C. or more, compared with the crystalline aromatic polyether ketone having only units of formula (B). Taking this into consideration, a particularly preferable proportion of the unit (A) is 20 mole % or more.

The aromatic polyether ketone comprising only units of formula (A) is novel and amorphous polymer having a glass transition point of about 230° C. This polymer is one of particularly preferable polymers and can be easily melt molded at a temperature of about 330° C. to about 370° C.

Even when the aromatic polyether ketones containing the units (A) according to this invention are crystalline, the melting points are lower than a crystalline polyether ketone having only units (B) whose melting point is 365°–367° C. Therefore the melt molding processing of the polymers can be carried out relatively easily. This is one of the features of the polymers of this invention.

Another feature of the polymers of this invention is that crystalline aromatic polyether ketones can be obtained from amorphous polyether ketones by changing the proportion of unit (A).

The aromatic polyether ketones of this invention should have reduced viscosity of about 0.1 to about 4.0, preferably about 0.5 to about 3.0 measured at 30° C. and a concentration of 0.1 g/dl using 98% by weight sulfuric acid as solvent. Such polymers are excellent not only in melt processability but also in physical and chemical properties.

The aromatic polyether ketones produced by the above-mentioned polycondensation processes usually have hydroxy terminal groups represented by the formula: —OM (wherein M is hydrogen or an alkali metal atom) and halogeno terminal groups represented by —X. Although these polymers are excellent in heat resistance, chemical resistance, mechanical and electrical properties as they are, their properties can be further improved when the terminals of the polymer are capped with inert aromatic groups. Particularly, the capping effects can be observed in improving the physical properties at high temperatures such as improvement in pyrolysis begining temperature, and in melt processability.

The terminal capping reaction can be conducted by conventional processes. One of the preferable processes can be carried out, after the formation of the polymer having a predetermined degree of polymerization by way of a polycondensation reaction, by (i) adding an aromatic compound which can react with the hydroxy terminal groups of the polymer or an aromatic compound which can react with the halogen terminal groups of the polymer, and heating at a temperature of about 100° C. to about 400° C. to cap either the hydroxy terminal or the halogen terminal, or (ii) adding an aromatic compound which can react with hydroxy terminal groups of the polymer, and heating at a temperature of about 100° C. to about 400° C. to cap the hydroxy terminal, then adding an aromatic compound which can react with halogen terminal groups of the polymer, and heating at a temperature of about 100° C. to about 400° C. to cap the halogen terminal and vice versa, so as to cap both the hydroxy terminal and the halogen terminal of the polymer.

Among these terminal capped aromatic polyether ketones, those wherein at least hydroxy terminals are capped with the inert aromatic groups are preferable.

Aromatic monohalides or aromatic mononitro compounds having electron withdrawing substituents are preferably used as the capping agents for the hydroxy terminal (—OM), and which can introduce the inert aromatic groups into the polymer terminals by replacing the M.

Preferred examples of the aromatic monohalides are monohalogenated benzenes such as fluorobenzene, chlorobenzene, bromobenzene, iodobenzene; monohalogenated naphthalenes such as fluoronaphthalene, chloronaphthalene, bromonaphthalene, iodonaphthalene; compounds of the formula:

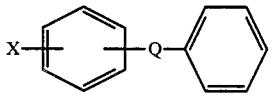

(E)

wherein X is a halogen atom; Q is a chemical bond or a divalent group of the formula: —O—, —S—, —CO—, —SO—, —SO$_2$—, or —C(R$^1$R$^2$)— (in which R$^1$ and R$^2$ are independently hydrogen or a lower alkyl group). Those wherein Q is —CO— or —SO$_2$— are more preferable. Particularly preferable examples are 4-chlorobenzophenone, 4-fluorobenzophenone, 4-chlorodiphenylsulfone, 4-fluorodiphenylsulfone.

Preferred examples of the aromatic mononitro compounds having electron withdrawing groups are nitrobenzonitrile (including individual isomers), cyanonitronaphthalene (including individual isomers), N-phenyl-4-nitronaphthalene, and compounds of the formula:

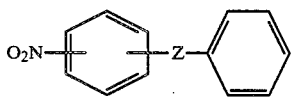

(F)

wherein Z is —CO— or —SO$_2$—.

Aromatic monohydroxyl compounds are preferably used as the capping agents for the halogen terminals, and which can introduce the inert aromatic groups into the polymer terminals by replacing the halogen.

Preferred examples of the aromatic monohydroxyl compounds are phenol, naphthol, and compounds of the formula:

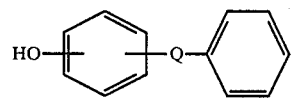

(G)

wherein Q is defined above. These aromatic hydroxyl compounds can be also used in the form of alkali metal salts thereof.

Further, one or more hydrogen atoms in the aromatic ring of these aromatic capping agents can be substituted with one or more lower alkyl groups, lower alkoxy groups, phenyl groups, cyano groups, ester groups and like groups inert to the reaction.

The reaction temperature and the reaction time of the terminal capping reaction vary depending on the kind and amount of the polymer terminals, the kind and amount of the capping agent and the presence or absence of a solvent, but usually are about 100° C. to about 400° C. for 1 minute to 50 hours, preferably about 150° C. to about 350° C. for 5 minutes to 25 hours.

The amount of the capping agent used for terminal capping reaction can be an equal amount or less than the polymer terminals to be capped, but preferably is an amount equal or greater than the polymer terminals to be capped.

The aromatic polyether ketones comprising the units (A) or both the units (A) and (B) and having the capped terminals are novel polymers, the proportion of the unit (A) being 5 to 100 mole %, and having reduced viscosity of about 0.1 to about 4.0, preferably about 0.5 to about 3.0 measured at 30° C. and a concentration of 0.1 g/dl using 98% by weight sulfuric acid as solvent. Such polymers are excellent not only in melt processability but also in physical and chemical properties.

Since the aromatic polyether ketones of this invention have aromatic rings bonded by carbonyl linkage and ether linkage at their para-positions, these polymers have excellent properties in heat resistance (pyrolysis beginning temperature in nitrogen being 430° C. or higher), chemical resistance (almost no solvent except for concentrated sulfuric acid), mechanical and electrical properties. Further, since the aromatic polyether ketones of this invention contain the aromatic rings having methyl groups in the polymer chain, these polymers can be relatively easily melt molded and processed compared with the known aromatic polyether ketones containing no such substituents on the aromatic rings. For example, the polymers of this invention can be melt molded in the temperature range from about 300° C. to lower than about 400° C.

The aromatic polyether ketones having capped or non-capped terminals according to this invention can be used alone as structural materials, films, fibers, fibrils, coating materials, and the like, or used together with other polymers as blends, or used as composite materials mixed with other reinforcing materials or fillers such as glass fibers, carbon fibers, aromatic polyamide fibers, calcium carbonate, calcium silicate, and the like.

This invention is illustrated by way of the following Examples, wherein the values of reduced viscosity were obtained by measuring at 30° C. and a concentration of 0.1 g/dl using 98% by weight sulfuric acid as solvent.

EXAMPLE 1

Into a vessel equipped with a stirrer, a nitrogen inlet, a thermometer and an air-cooling type condenser, 24.4 g of 4-(p-fluorobenzoyl)-2,6-dimethylphenol and 80 g of diphenyl sulfone were charged and heated to about 170° to 180° C. to give a homogeneous solution. Then, a mixture of 6.19 g of finely powdered anhydrous sodium carbonate and 0.43 g of finely powdered anhydrous potassium carbonate was added to the solution and heated at about 200° to 210° C. for 1 hour, at about 240° to 250° C. for 15 minutes, an at about 270° to 280° C. for 4 hours under a nitrogen atmosphere with stirring to perform polycondensation.

The resulting viscous reaction mixture was taken out while hot, and cooled and pulverized. The resulting powder was washed and extracted with acetone and hot water several times, respectively, to remove the diphenyl sulfone and the inorganic salts. After drying at about 150° C. under reduced pressure, 22.0 g of ivory-white polymer was obtained. The yield was almost quantitative. The polymer had a reduced viscosity of 1.7 and the following elementary analysis values:

|  | C (%) | H (%) |
|---|---|---|
| Calcd. for $(C_{15}H_{12}O_2)_n$ | 80.4 | 5.4 |
| Found | 80.3 | 5.2 |

The infra-red spectrum of the polymer had absorptions at 2850–2950 $cm^{-1}$ (methyl group), at 1650–1660 $cm^{-1}$ and 1585–1610 $cm^{-1}$ (carbonyl group and benzene ring conjugated thereto respectively) and at 1100–1330 $cm^{-1}$ (aromatic ether group).

These results and NMR analysis revealed that the polymer was an aromatic polyether ketone comprising units of the formula:

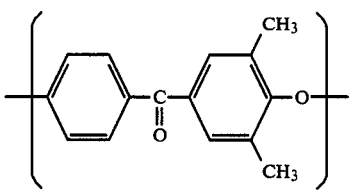

(A)

This aromatic polyether ketone was an amorphous polymer having a glass transition point (Tg) of about 230° C. with little decrease in weight until 430° C. under nitrogen atmosphere was shown by the curve (a) in FIG. 1 of the thermogravimetric analysis chart.

EXAMPLE 2

Using 24.4 g of 4-(p-fluorobenzoyl)-2,6-dimethylphenol and 80 g of diphenyl sulfone, the polycondensation was carried out in the same manner as described in Example 1. Then, 1.25 g of p-fluorobenzophenone in 10 ml of sulfolane was added to the hot reaction mixture and the resulting mixture was maintained at about 270° to 280° C. for 1 hour with stirring to perform the capping reaction for the hydroxy terminals of the polymer. The solution was a yellowish viscous solution during the polycondensation reaction, but it changed to an ivory-white viscous solution after the addition of p-fluorobenzophenone with stirring. This means that alkali metal phenoxide groups of the polymer terminals are disappeared and capped with stable p-benzoylphenyl groups by replacing the alkali metal cations.

Figure 2:
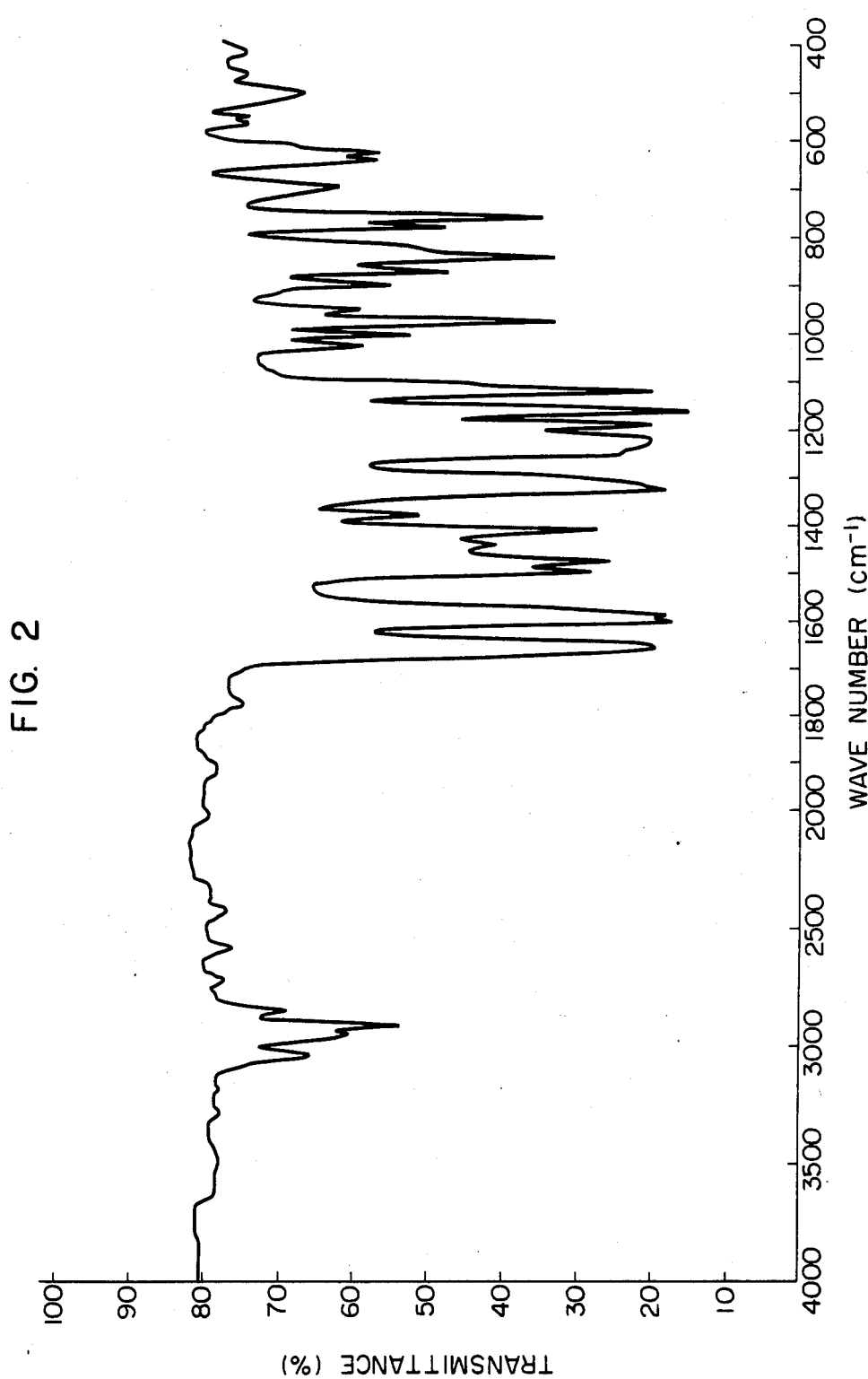
FIGS. 2 and 3 show infra-red spectra of the aromatic polyether ketones obtained in Examples 2 and 15 according to this invention.

The resulting viscous reaction mixture was taken out while hot, and cooled and pulverized. The resulting powder was washed and extracted with acetone and hot water several times, respectively, to remove the diphenyl sulfone, sulfolane and the inorganic salts. After drying at about 150° C. under reduced pressure, 22.2 g of ivory-white polymer was obtained almost quantitatively. The polymer had a reduced viscosity of 1.7. As shown in FIG. 2 of the infra-red spectrum, the polymer showed the same absorptions as those of the polymer obtained in Example 1 in the main absorption bands.

From the fact that the yellow color due to the alkali metal phenoxide groups was disappeared by the terminal capping reaction and the results of the infra-red spectrum, the polymer was identified as an aromatic polyether ketone wherein hydroxy terminals were capped with the aromatic groups and represented by the formula:

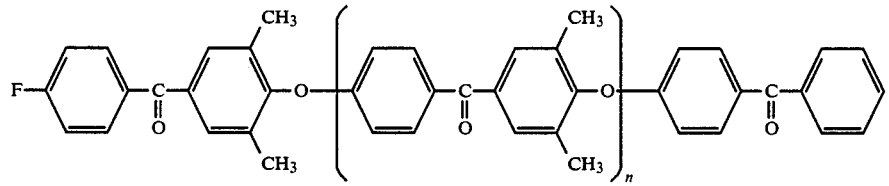

wherein n is a positive integer.

The thermogravimetric analysis chart of this polymer is shown by the curve (b) in FIG. 1. As is clear from FIG. 1, the pyrolysis beginning temperature under nitrogen atmosphere is raised by about 25° C. from about 430° C. to about 455° C. by capping the hydroxy terminals. This polymer was amorphous one having a Tg of about 230° C.

A pale yellow transparent tough film could be easily obtained by pressing this polymer under a pressure of about 100 kg/$cm^2$ at about 360° C. The infra-red spectrum of this film was shown in FIG. 2.

EXAMPLE 3

The process of Example 2 was repeated except for using 2.5 g of p-chlorodiphenylsulfone instead of p-fluorobenzophenone to perform the polycondensation, the terminal capping reaction and the after-treatment.

As a result, an ivory-white polymer having capped hydroxy terminals and a structure of the formula:

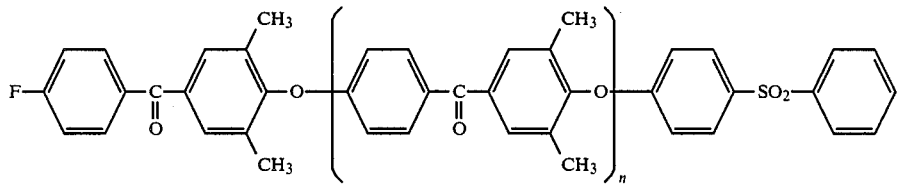

was obtained almost quantitatively (22.4 g). The polymer had a reduced viscosity of 1.6, and was amorphous one having a Tg of about 230° C. The polymer showed almost the same behavior as that of the polymer obtained in Example 2 in the thermogravimetric analysis.

EXAMPLE 4

The process of Example 1 was repeated except for using 70 g of sulfolane instead of diphenyl sulfone to perform the polycondensation and the after-treatment. The similar polymer obtained in Example 1 was yielded almost quantitatively. The polymer had a reduced viscosity of 1.5.

EXAMPLE 5

The process of Example 1 was repeated except for using 80 g of benzophenone instead of diphenyl sulfone to perform the polycondensation and the after-treatment. The similar polymer obtained in Example 1 was yielded almost quantitatively. The polymer had a reduced viscosity of 1.2.

EXAMPLE 6

Into the same reaction vessel a used in Example 1, 8.46 g of yellow powder of potassium salt of 4-(p-fluorobenzoyl)-2,6-dimethylphenol obtained by reacting 4-(p-fluorobenzoyl)-2,6-dimethylphenol with an aqueous solution of potassium hydroxide, followed by removing the water and drying under vacuum at about 150° C., and 9 g of diphenyl sulfone were charged and reacted with stirring at about 240° C. for 1 hour, and at about 280° C. for 30 minutes to perform the polycondensation. The after-treatment was carried out in the same manner as described in Example 1 to yield ivory-white polymer almost quantitatively. The polymer had a reduced viscosity of 1.2.

EXAMPLE 7

Into a reaction vessel, 3.2 g of 4-(p-chlorobenzoyl)-2,6-dimethylphenol, 10 g of diphenyl sulfone and 0.86 g of finely powdered anhydrous potassium carbonate were charged and reacted at about 320° C. for 10 hours with stirring to perform the polycondensation. The similar after-treatment described in Example 1 was conducted to give a pale brown polymer in 90% yield. The polymer showed almost the same infra-red absorption spectrum and thermogravimetric analysis chart as obtained in the polymer of Example 1. The polymer had a reduced viscosity of 0.5.

EXAMPLE 8

Into a similar reaction vessel used in Example 1, 17.08 g of 4-(p-fluorobenzoyl)-2,6-dimethylphenol, 6.48 g of 4-(p-fluorobenzoyl)phenol and 50 g of diphenyl sulfone were charged and heated to about 180° C. to give a homogeneous solution. Subsequently, a mixture of 4.98 g of finely powdered anhydrous sodium carbonate and 0.42 g of finely powdered anhydrous potassium carbonate was added to the solution and the reaction was carried out at about 200° C. for 1 hour, about 250° C. for 1 hour and about 280° C. for 1.2 hours with stirring. After similar after-treatment described in Example 1 was carried out, 21.5 g of an ivory-white polymer was obtained almost quantitatively. The polymer had a reduced viscosity of 1.8.

Elementary analysis of the polymer was as follows.

|  | C (%) | H (%) |
|---|---|---|
| Calcd. for $(C_{14.4}H_{10.8}O_2)_n$ | 80.15 | 5.01 |
| Found | 80.2 | 5.0 |

The infra-red spectrum of the polymer was similar to FIG. 2 except that the absorptions in the region of 2850–2950 cm$^{-1}$ due to the methyl groups was relatively small.

These results and NMR analysis revealed that the polymer was an aromatic polyether ketone comprising

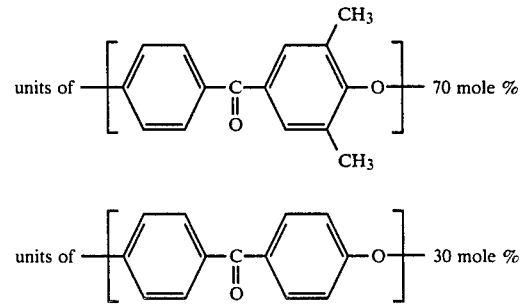

No weight loss was observed until 440° C., when this aromatic polyether ketone was subjected to the thermogravimetric analysis under nitrogen atmosphere. This polymer was an amorphous polymer having a Tg of about 230° C.

EXAMPLE 9

Into a vessel, 16.92 g of yellow powder of potassium salf of 4-(p-fluorobenzoyl)-2,6-dimethylphenol obtained by a similar manner described in Example 6, 10.16 g of yellow powder of potassium salt of 4-(p-fluorobenzoyl)-phenol obtained by a similar manner, and 45 g of diphenyl sulfone were charged and reacted about at 240° C. for 1 hour and at about 280° C. for 1 hour with stirring to perform the polycondensation. After the same after-treatment as described in Example 1 was carried out, 21.2 g of an ivory-white polymer similar to that obtained in Example 8 was yielded almost quantitatively. The polymer had a reduced viscosity of 1.4.

Elementary analysis of this polymer was as follows.

|  | C (%) | H (%) |
|---|---|---|
| Calcd. for $(C_{14.2}H_{10.4}O_2)_n$ | 80.08 | 4.89 |

-continued

|  | C (%) | H (%) |
|---|---|---|
| Found | 80.1 | 4.9 |

These results and NMR analysis revealed that the polymer had the following structure:

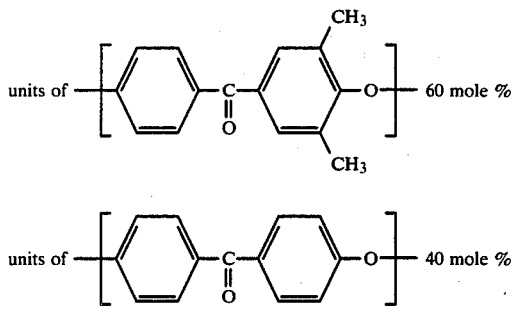

EXAMPLES 10-12

The process of Example 8 was repeated except for changing the amounts of 4-(p-fluorobenzoyl)-2,6-dimethylphenol (a) and 4-(p-fluorobenzoyl)phenol (b) as shown in Table 1 to yield almost quantitatively ivory-white or pale yellow aromatic polyether ketones having the following structures:

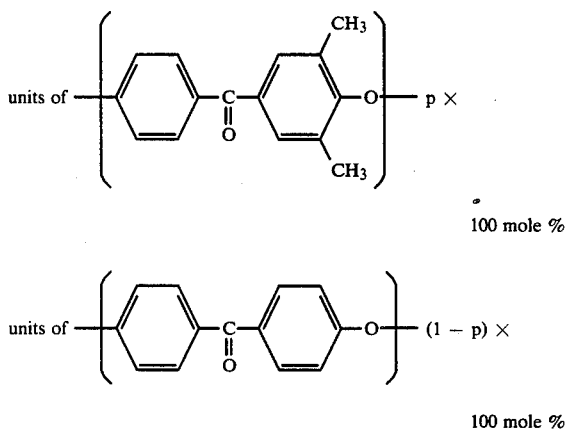

Physical properties of these polymers were measured and listed in Table 1.

TABLE 1

| Example No. | Monomer (a) (g) | (b) (g) | Aromatic polyether ketone P | RV | Tg (°C.) | Td (°C.) |
|---|---|---|---|---|---|---|
| 10 | 21.96 | 2.16 | 0.9 | 1.7 | 220 | 440 |
| 11 | 12.20 | 10.80 | 0.5 | 1.4 | 210 | 450 |
| 12 | 7.32 | 15.12 | 0.3 | 1.6 | 200 | 480 |

(Note)
RV = Reduced viscosity
Tg = Glass transition point
Td = Pyrolysis beginning temperature under $N_2$ The polymers obtained in Examples 10 and 11 were amorphous and that of Example 12 was a polymer containing partially crystalline portions.

EXAMPLE 13

In a reaction vessel, 18.24 g of 4-(p-chlorobenzoyl)-2,6-dimethylphenol, 6.98 g of 4-(p-chlorobenzoyl)phenol, 60 g of diphenyl sulfone and 6.9 g of finely powdered anhydrous potassium carbonate were placed and reacted at about 320° C. for 10 hours with stirring to perform the polycondensation. After the same after-treatment as described in Example 1 was carried out, a pale brown polymer was obtained 90% in yield. The infra-red spectrum and the thermogravimetric analysis showed that this polymer was almost the same as the polymer obtained in Example 8. The polymer had a reduced viscosity of 0.6.

EXAMPLE 14

In the same vessel as used in Example 1, 17.08 g of 4-(p-fluorobenzoyl)-2,6-dimethylphenol and 6.48 g of 4-(p-fluorobenzoyl)phenol were placed and heated to about 160° C. with stirring under nitrogen atmosphere to give a homogeneous solution. Subsequently, a mixture of 5.01 g of finely powdered anhydrous sodium carbonate and 0.72 g of finely powdered anhydrous potassium carbonate was added to the solution and reacted at about 200° C. for 1 hour, about 250° C. for 30 minutes and about 270°-280° C. for 4 hours to perform the polycondensation. Then, 2.52 g of p-chlorodiphenylsulfone in 5 ml of sulfolane was added to the reaction solution to carry out the terminal capping reaction at about 280° C. for 1 hour with stirring. As a result, a yellowish viscous solution was changed to an ivory viscous solution. After the same after-treatment as Example 1, 21.8 g of an ivory-white polymer was yielded almost quantitatively. The polymer had a reduced viscosity of 1.5.

The NMR analysis and the infra-red spectrum revealed that this polymer was an aromatic polyether ketone comprising the following structure:

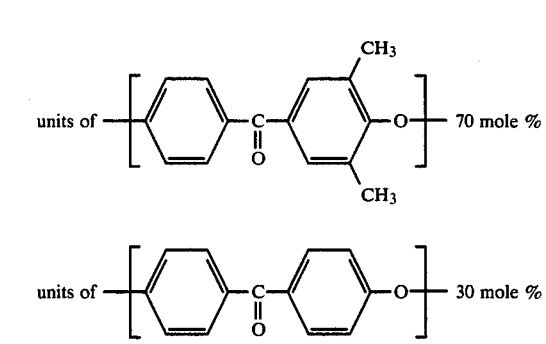

and the hydroxy terminals were capped with the aromatic groups of the formula:

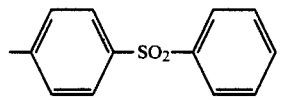

Further, no weight loss was observed until 450° C. under nitrogen atmosphere by the thermogravimetric analysis. This terminal capped aromatic polyether ketone was an amorphous polymer having a Tg of about 230° C.

EXAMPLE 15

Figure 3:
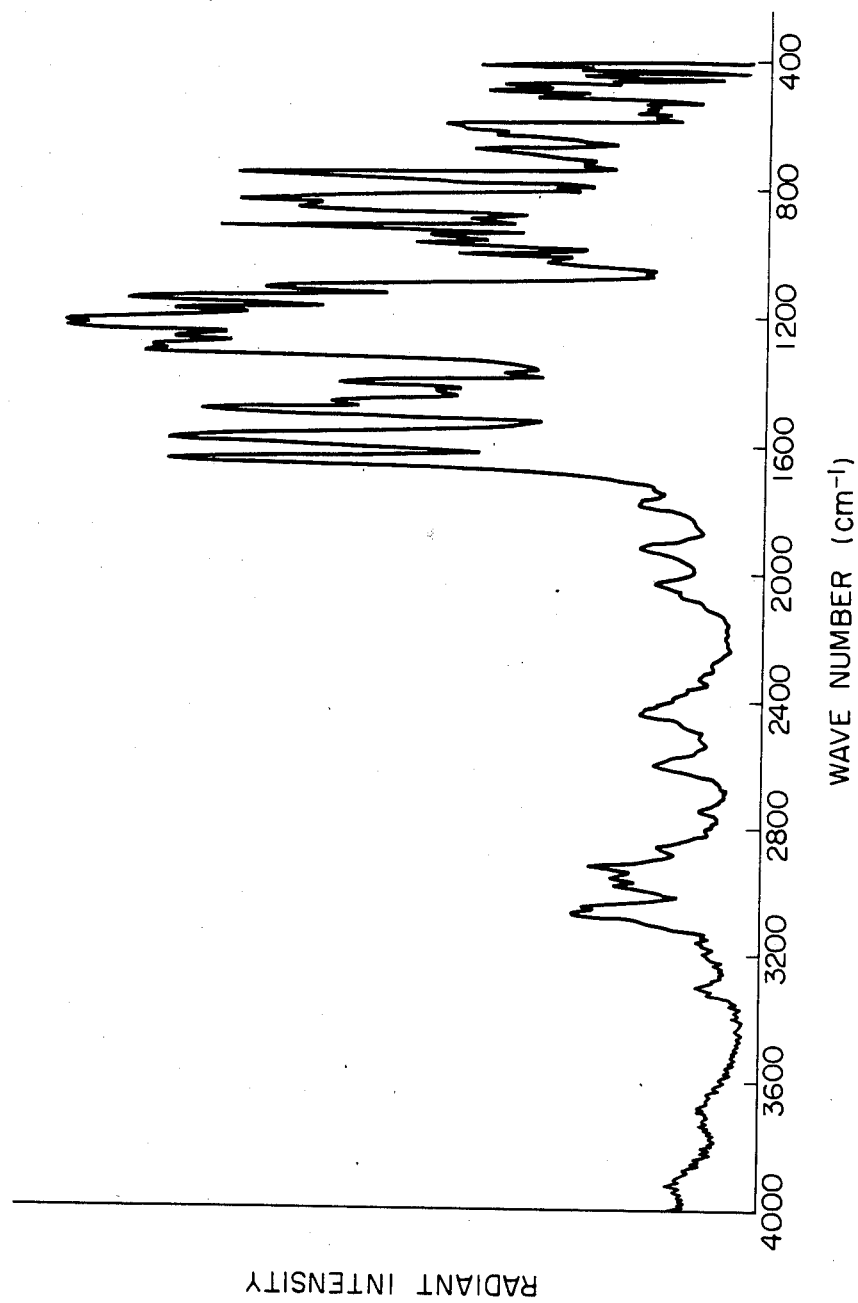

The process of Example 14 was repeated except for using 12.2 g of 4-(p-fluorobenzoyl)-2,6-dimethylphenol, 10.8 g of 4-(p-fluorobenzoyl)phenol and 2.0 g of p-fluorobenzophenone as a terminal capping agent, to perform the polycondensation, the terminal capping reaction and the after-treatment. As a result, 21.1 g of an ivory-white polymer was yielded almost quantitatively. This polymer had a reduced viscosity of 1.6. The NMR analysis and the infra-red spectrum shown in FIG. 3 revealed that this polymer was an aromatic polyether ketone comprising following structure:

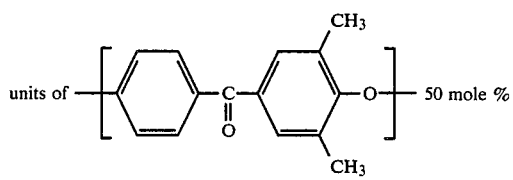

units of ——— 50 mole %

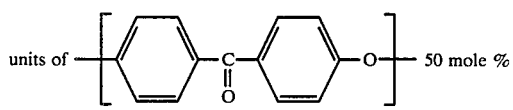

units of ——— 50 mole % and the hydroxy terminals were capped with the aromatic groups of the formula:

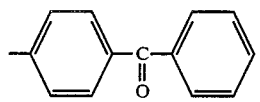

Further, no weight loss was observed until about 455° C. under nitrogen atmosphere by the thermogravimetric analysis. This terminal capped aromatic polyether ketone was an amorphous polymer having a Tg of about 210° C.

EXAMPLE 16

The process of Example 14 was repeated except for using 1.22 g of 4-(p-fluorobenzoyl)-2,6-dimethylphenol and 20.52 g of 4-(p-fluorobenzoyl)phenol, to perform the polycondensation, the terminal capping reaction and the after-treatment. As a result, an ivory-white polymer having a reduced viscosity of 1.3 was obtained almost quantitatively. The NMR analysis and the infra-red spectrum revealed that this polymer was an aromatic polyether ketone comprising the following structure:

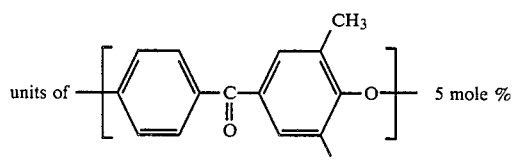

units of ——— 5 mole %

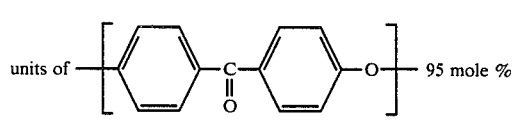

units of ——— 95 mole % and the hydroxy terminals were capped with the aromatic groups of the formula:

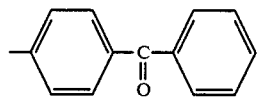

Further, no weight loss was observed until about 510° C. under nitrogen atmosphere by the thermogravimetric analysis. This terminal capped aromatic polyether ketone was a crystalline polymer having a melting point of about 350° C.

EXAMPLE 17

The process of Example 14 was repeated except for using 4.88 g of 4-(p-fluorobenzoyl)-2,6-dimethylphenol and 17.28 g of 4-(p-fluorobenzoyl)phenol, to perform the polycondensation, the terminal capping reaction and the after-treatment. As a result, an ivory-white polymer having a reduced viscosity of 1.5 was obtained almost quantitatively. The NMR analysis and the infra-red spectrum revealed that this polymer was an aromatic polyether ketone comprising the following structure:

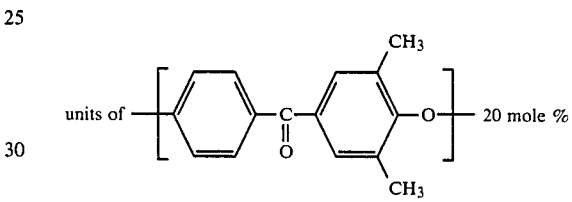

units of ——— 20 mole %

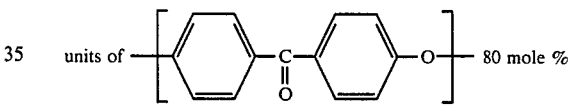

units of ——— 80 mole % and the hydroxy terminals were capped with the aromatic groups of the formula:

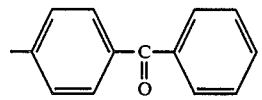

Further, no weight loss was observed until about 480° C. under nitrogen atmosphere by the thermogravimetric analysis. This terminal capped aromatic polyether ketone was a polymer containing partially crystalline portions and having a Tg of about 200° C. and a melting point of about 350° C.

EXAMPLE 18

In the same reaction vessel as used in Example 1, 14.64 g of 4-(p-fluorobenzoyl)-2,6-dimethylphenol, 8.64 g of 4-(p-fluorobenzoyl)phenol and 90 g of diphenyl sulfone were placed and heated to about 180° C. to give a homogeneous solution. Subsequently, a mixture of 5.8 g of finely powdered anhydrous sodium carbonate and 1.2 g of finely powdered anhydrous potassium carbonate was added to the solution, and the polycondensation reaction was carried out at about 200° C. for 1 hour, about 250° C. for 1 hour and about 280° C. for 4 hours with stirring. Then, 1.9 g of p-hydroxybenzophenone in 5 ml of sulfolane was added to the reaction mixture and maintained at about 280° C. for 1 hour with stirring to carry out the capping reaction for the fluorine terminal groups. After that, further, 2.4 g of p-chlorodiphenylsulfone in 5 ml of sulfolane was added to the reaction mixture at that temperature and the capping reaction for the hydroxy terminal groups was carried out at about 280° C. for 1 hour with stirring. After the same aftertreatment as in Example 1, an ivory-white polymer was obtained almost quantitatively.

The NMR analysis and the infra-red spectrum revealed that this polymer was an aromatic polyether ketone comprising the following structure:

units of 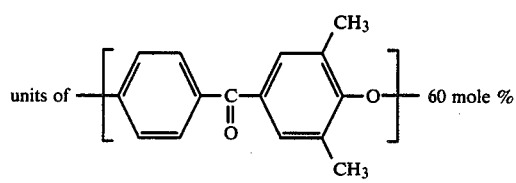 60 mole % units of 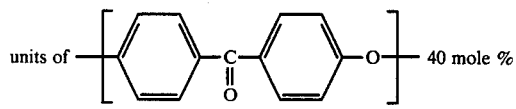 40 mole % and the hydroxy terminals were capped with the aromatic groups of the formula:

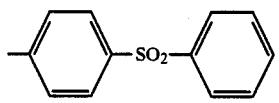

and another kind of terminals were capped with the aromatic groups of the formula:

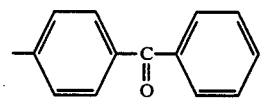

The polymer had a reduced viscosity of 1.3. Further no weight loss was observed until 460° C. under nitrogen atmosphere by the thermogravimetric analysis.

In these Examples, all the polycondensation reactions and the terminal capping reactions were carried out under nitrogen atmosphere.

The aromatic polyether ketones obtained in the above Examples were able to give pale yellow transparent or milky-white films with high tenacity and toughness when they were subjected to pressing under a pressure of about 50 to 150 kg/cm² at about 300° to 390° C.

What is claimed is:

1. An aromatic polyether ketone comprising 5 to 100 mole % of units having the formula:

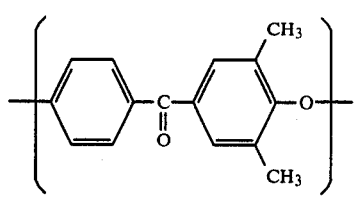 (A)

and 0 to 95 mole % of units having the formula:

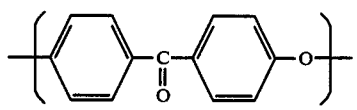 (B)

and having a reduced viscosity of about 0.1 to about 4.0 measured at 30° C. and a concentration of 0.1 g/dl by using 98% by weight sulfuric acid as a solvent.

2. An aromatic polyether ketone according to claim 1, wherein the polymer comprising 20 to 100 mole % of units of (A) and 0 to 80 mole % of units of (B).

3. An aromatic polyether ketone according to claim 1, wherein the polymer comprising 100 mole % of units of (A).

4. An aromatic polyether ketone according to claim 1, wherein the polymer having a reduced viscosity of about 0.5 to about 3.0.

5. An aromatic polyether ketone according to claim 1, wherein at least one terminal group of the polymer is capped with an inert aromatic group.

6. An aromatic polyether ketone according to claim 1, wherein the hydroxy terminal group of the polymer represented by the formula: —OM, in which M is hydrogen or an alkali metal atom, is capped with an inert aromatic group by replacing the M with the inert aromatic group.

7. An aromatic polyether ketone according to claim 2, wherein at least one terminal group of the polymer is capped with an inert aromatic group.

8. An aromatic polyether ketone according to claim 2, wherein the hydroxy terminal group of the polymer represented by the formula: —OM, in which M is hydrogen or an alkali metal atom, is capped with an inert aromatic group by replacing the M with the inert aromatic group.

9. An aromatic polyether ketone according to claim 3, wherein at least one terminal group of the polymer is capped with an inert aromatic group.

10. An aromatic polyether ketone according to claim 3, wherein the hydroxy terminal group of the polymer represented by the formula: —OM, in which M is hydrogen or an alkali metal atom, is capped with an inert aromatic group by replacing the M with the inert aromatic group.

11. An aromatic polyether ketone according to claim 6, wherein the inert aromatic group is a benzoylphenyl group and/or a benzenesulfonylphenyl group.

12. An aromatic polyether ketone according to claim 8, wherein the inert aromatic group is benzoylphenyl group and/or a benzenesulfonylphenyl group.

13. An aromatic polyether ketone according to claim 10, wherein the inert aromatic group is a benzoylphenyl group and/or a benzenesulfonylphenyl group.

* * * * *